United States Patent [19]

Wu

[11] 3,941,857

[45] Mar. 2, 1976

[54] POLYVINYLCHLORIDE/OLEFIN COPOLYMERS STABILIZED WITH EPOXY RESIN

[75] Inventor: Souheng Wu, Wilmington, Del.

[73] Assignee: E. I. Du Pont de Nemours and Company, Wilmington, Del.

[22] Filed: Nov. 1, 1974

[21] Appl. No.: 520,113

Related U.S. Application Data

[63] Continuation-in-part of Ser. No. 341,333, March 15, 1973, abandoned.

[52] U.S. Cl. .......................... 260/837 PV; 260/836
[51] Int. Cl.² .................................... C08L 63/10
[58] Field of Search..... 260/87.5 C, 837 R, 837 PV, 260/836

[56] References Cited
UNITED STATES PATENTS

| | | | |
|---|---|---|---|
| 2,510,426 | 6/1950 | Smith | 260/87.5 C |
| 2,564,194 | 8/1951 | Leendert et al. | 260/837 PV |
| 2,609,355 | 9/1952 | Winkler | 260/837 PV |
| 2,971,933 | 2/1961 | Beal | 260/837 PV |

*Primary Examiner*—Murray Tillman
*Assistant Examiner*—J. Ziegler

[57] ABSTRACT

A composition comprising a vinylchloride/olefin copolymer and a small amount of an epoxy resin is provided. The epoxy resin reacts with residual surfactants in the copolymer on heating. Coatings of the composition have satisfactory hot water resistance. Coatings prepared from the copolymer without epoxy resin have inconsistant performance as to hot water resistance with a substantial tendency toward pitting as shown by "blushing."

8 Claims, No Drawings

POLYVINYLCHLORIDE/OLEFIN COPOLYMERS STABILIZED WITH EPOXY RESIN

CROSS-REFERENCE TO RELATED APPLICATIONS

This application is a continuation-in-part of Ser. No. 341,333, filed Mar. 15, 1973, now abandoned.

BACKGROUND OF THE INVENTION

This invention relates to vinylchloride/olefin copolymer compositions and surfaces coated therewith.

Vinylchloride/olefin copolymers are typically made by suspension or emulsion polymerization. Coatings of such copolymers show inconsistent performance in hot water resistance and tend to be sensitive to water in that pitting or "blushing" (a whitening effect) may sporadically occur, particularly after exposure of such a coating to boiling water for extended periods. In some end uses such as can coatings, this characteristic is detrimental both aesthetically and in causing the corrosion of the can metal.

SUMMARY OF THE INVENTION

I have found that this problem is the result of surfactants used in the manufacture of the copolymer resin and that these deleterious characteristics can be minimized by mixing with the copolymer, preferably in solvent, before casting a film, about 0.5 to 2%, preferably up to about 1% by weight, of an epoxy resin. The epoxy resin appears to react and cross-link with the residual surfactants, thereby improving the stability of the coating to hot water. Adhesion to aluminum is also improved.

DETAILED DESCRIPTION OF THE INVENTION

The composition of this invention is a polymeric composition comprising (A) and (B) having by weight of (A) and (B) 98 to 99.8% of (A) a vinylchloride/olefin copolymer of film forming molecular weight prepared using epoxy reactive surfactant, and 0.5 to 2% of (B) an epoxy resin.

Preferably, (A) consists of vinylchloride/ethylene copolymer or vinylchloride/propylene copolymer of a number average molecular weight of between 20,000 and 100,000 and (B) consists of an epoxy resin having greater than 1 and no more than 3 equivalents of oxirane per molecule with an epoxy equivalent weight of between 150 and 6,000. Most preferably, (A) contains between 2 and 10% ethylene units, and (B) has not more than 3 oxirane equivalents per molecule. In a most preferred embodiment (A) has a number average molecular weight between 50,000 and 75,000 and the ethylene or propylene content is between 3 and 5% by weight of the copolymer, and (B) has an equivalent weight of between 160 and 1,000 and is present in an amount of between 0.8 and 1.2% by weight of (A) and (B).

The "epoxy resin" is at least one member of the class comprising aromatic epoxies, cycloaliphatic epoxies and aliphatic epoxies. An aromatic epoxy is usually prepared as the reaction product of epichlorohydrin and Bisphenol A such as Epon 828 and Epon 1007 made by Shell Chemical Company. Cycloaliphatic epoxy resins are prepared by reaction of appropriate olefins with peracetic acid. Typical of this type of epoxy resin is Bakelite ERL 4221 and Bakelite ERR 4205 made by Union Carbide which are respectively (3,4 epoxy cyclohexylmethyl-3,4-epoxycyclohexane carboxylate) and (bis(2,3-epoxycyclophenyl)ether). Aliphatic epoxy resins are typically made from epichlorohydrin and aliphatic polyols. Examples of this type of resin are Epon 871 and Epon 872. Also epoxy effectiveness is dependent on degree of reaction between epoxy resin and surfactant. Accordingly, higher temperatures may be necessary for reaction with epoxy resin of higher epoxy equivalent weight.

Preferably, the polymeric components consist essentially of (A) and (B).

Surfaces coated with a film of the composition herein claimed are also within the scope of this invention. The process of coating a surface with the compositions herein claimed are also within the scope of this invention.

By vinylchloride/olefin copolymers is meant copolymers of film-forming molecular weight (sufficient to form a self-supporting film when cast from solution) comprising at least about 2% olefin content by weight. The term includes the presence of typical contaminants such as epoxy reactive surfactants. Preferred olefins are ethylene and propylene and the polymers may be either random or block copolymers. The olefin may be pendant or in the chain. Random copolymers are preferred. The olefin content is typically not in excess of 10% by weight of copolymer and most preferably between 3 and 5% by weight. These polymers are typically prepared by polymerization in suspension or emulsion such as set forth in U.S. Pat. No. 3,468,858 and British No. 1,096,890. Such polymerization involves use of surfactant such as methyl cellulose or polyacrylates or polyacrylic acids which are epoxy reactive. The surfactant remains in the suspension of emulsion.

Epoxy reactive surfactants contain hydroxyl, carboxylic, amino or other groups which are reactive with epoxy resin at least at temperatures of the baking of the composition. This reaction is necessary for the benefits of this invention to be realized. Other epoxy-reactive surfactants include acetylated polyvinyl alcohol, gelatin and sodium or ammonium lauryl sulfate. Typically these surfactants are present in amounts of between 0.01 and 0.5% and most typically at 0.02–0.2% by weight of polymer. This, of course, controls the amount of epoxy preferably added in the practice of this invention. Under conditions of processing of the copolymer in forming a film according to the present invention the surfactant will react with the epoxy resin or both to remove the surfactant as a water-sensitive component from the composition.

The composition comprising the vinylchloride/olefin copolymer may contain other polymeric ingredients. Solvents such as cyclohexanone, tetrahydrofuran and methylethyl ketone and mixtures thereof and other solvents may also be present. Fillers, pigments, stabilizers, adhesion promoters and the like are all suitable additives.

No epoxy hardening agent need be present in the composition for epoxy reaction between the epoxide and the surfactant in preferred embodiments. In a preferred embodiment there is no hardening agent present. The resultant coating is thus thought to be suitable for can coating or other coatings where the hot water resistance of coating films of the copolymer is an asset.

Presence of other polymeric materials such as a vinylchloride/vinyl acetate/maleic acid terpolymer (Vinylite VMCH Union Carbide) may affect results, shift or broaden the percentage of epoxy resin which produces preferred results.

Compositions containing substantial quantities of epoxy reactive resins such as aminoplast resins (say in excess of 5% by weight of polymeric components) are outside the scope of this invention. Preferably, the composition contains less than 1% by weight of epoxy reactive material other than surfactant and most preferably substantially no epoxy reactive material other than surfactants.

Where epoxy reactive material other than surfactant is present, there may be competition for oxirane group between the surfactant and other epoxy reactive groups. Accordingly, it is preferred to add the epoxy resin to the vinylchloride/olefin copolymer with ample time for reaction between the surfactant in the copolymer and the epoxy resin.

Molecular weight of the copolymers is determined by gel permeation chromatography as set forth in "Physical Methods of Macromolecular Chemistry", Vol. II, Benj. Carroll, Editor, Marcel Dekker (1972) and "Modern Practice of Liquid Chromatography", edited by J. J. Kirkland, John Wiley (1971). Dispersity is determined by the same measurement.

In solutions as above-described, solids content of copolymer and epoxy resin is usually between 5 and 30% by weight of solution and most preferably between 15 and 25% by weight for coating purposes.

The composition is prepared as follows: The epoxy resin, preferably in liquid form, is added to and thoroughly mixed with the copolymer, preferably in a solution of copolymer. This mixture is then applied to a surface to be coated by typical coating techniques such as dipping, spraying, roller coating, brush coating and the like. The coating is then "cured" by heating to 100° to 200°C. for the desired period of time. Most typically, heating at temperatures between 250°F. and 550°F. for 20 seconds to 1 hour will suffice.

Where applicable the copolymer blend can be applied from a "melt" without solvent.

In the use of the compositions of this invention the residual surfactant associated with the copolymer is thought to react with the epoxy to provide improved water resistance expecially hot water resistance to the coating.

The following formulations were prepared within the scope of my invention.

I. (A) Vinylchloride/propylene copolymer - 90 parts
97/3 parts by weight
Mol. wt. - about 60,000 dispersity about 1.44

(X) Vinylchloride/vinyl acetate/maleic acid - 10 parts
86/13/1 parts by weight - Under trade name Vinylite VMCH of Union Carbide (B) Epon 828 Shell Chemical - 1 part
Epoxy equiv. wt. 185-192

(Y) Cyclohexanone/methylethyl ketone 70/30 - 400 parts

A suitable formulation according to the invention can be prepared as above with 100 parts of (A) and no (X).

II. Using nomenclature as above:

| | |
|---|---|
| (A) | 90 parts |
| (B) | 1 part |
| (X) | 10 parts |
| (Y) | 500 parts |
| Monastral blue pigment | 10 parts |
| Polyketone ZKR0252 resin - Union Carbide | 4 parts |
| Silicone leveling agent GE Silicone SF-69 | 0.15 part |

III. Using nomenclature as above:

| | |
|---|---|
| (A) | 90 parts |
| (X) | 10 parts |
| (B) | 1 part |
| Yellow Pigment 2RLT | 3 parts |
| (Y) | 400 parts |

TESTS

Suitability for use as a can coating is in part determined by resistance to whitening (blushing) on exposure to boiling water. The test for determining this is as follows: a panel coated with the coating to be evaluated is immersed in a bath of boiling water for 30 minutes. The panel is then removed from the bath, wiped dry with paper towel and visually inspected for "blushing" (whitening). Blushing is believed caused by formation of numerous small holes in the coating as water-soluble impurities such as surfactants dissolve away leaving voids.

In the Example which follows all parts are by weight unless otherwise indicated.

EXAMPLE

The following specimens were prepared by mixing varying parts of a vinylchloride/propylene (97/3) copolymer (Airco No. 480) and Epon 828 at room temperature in cyclohexanone solvent to give 20% solids.

The mixtures described below were coated onto aluminum panels about 4 inches × 12 inches in size by a standard drawdown coating technique. After permitting the coated films to air dry at ambient temperature, the panels were baked at 150°C. for 30 minutes. The coated aluminum panels were then partially submerged in boiling water (i.e., the boiling water test). Subjective observations are reported below:

| | Parts by Weight |
|---|---|
| A. Airco No. 480/Epon 828 After 30 minutes in boiling there was some whitening at the water/vapor line of the panel; other areas were good. | 100/10 |
| B. Airco No. 480/Epon 828 After 30 minutes in boiling water there was some whitening at the water/vapor line of the panel; all other areas were good. | 100/5 |
| C. Airco No. 480/Epon 828 After 30 minutes in boiling water there was no whitening on the panel. Only very slight sign of one or two white spots. Boiling water resistance very good. | 100/2 |
| D. Airco No. 480/Epon 828 After 4 hours in boiling water no sign of whitening on the panel. Boiling water resistance excellent. | 100/1 |
| E. Airco No. 480/Epon 828 After 30 minutes in boiling water results about the same as B above. | 100/0.5 |
| F. Control Airco No. 480 Repeated samples showed inconsistent results in boiling water test. Sporadic to extensive whitening occurs. | |

What is claimed is:

1. A composition comprising

A. 98–99.5% by weight, based on the weight of (A) plus (B), of a copolymer of film-forming molecular weight, prepared with and containing 0.01–0.5%, based on the weight of (A), of an epoxy reactive surfactant having at least one functional group selected from the group consisting of hydroxyl, carboxyl, amino, and sulfato, said copolymer comprising about 90 to 98% by weight vinyl chloride and about 2 to 10% by weight of ethylene or propylene; and B. 0.5–2% by weight, based on the weight of (A) plus (B), of an epoxy resin having greater than 1 and no more than 3 equivalents of oxirane per molecule with an equivalent weight of between 150 and 6,000.

2. The composition of claim 1 wherein
A. consists of vinyl chloride/ethylene copolymer, prepared with and containing epoxy reactive surfactant, having a number average molecular weight of between 20,000 and 100,000 and
B. consists of an epoxy resin having no more than 2 oxirane equivalents per molecule.

3. The composition of claim 1 wherein
A. consists of vinyl chloride/propylene copolymer, prepared with and containing epoxy reactive surfactant, having a number average molecular weight of between 20,000 and 100,000 and
B. consists of an epoxy resin having no more than 2 oxirane equivalents per molecule.

4. The composition of claim 2 wherein said copolymer of (A) has a number average molecular weight between 50,000 and 75,000 and the ethylene content is between 3 and 5% by weight of the copolymer and said epoxy resin of (B) has an equivalent weight of between 160 and 1,000 and is present in an amount of between 0.8 and 1.2% by weight of (A) and (B).

5. The composition of claim 3 wherein said copolymer of (A) has a number average molecular weight between 50,000 and 75,000 and the propylene content is between 3 and 5% by weight of the copolymer and said epoxy resin of (B) has an equivalent weight of between 160 and 1,000 and is present in an amount of between 0.8 and 1.2% by weight of (A) and (B).

6. The composition of claim 1 wherein the epoxy resin of (B) is the reaction product of epichlorohydrin and Bisphenol A.

7. The composition of claim 4 wherein the epoxy resin of (B) is the reaction product of epichlorohydrin and Bisphenol A.

8. The composition of claim 5 wherein the epoxy resin of (B) is the reaction product of epichlorohydrin and Bisphenol A.

* * * * *